June 28, 1927.
E. M. BILL
1,633,804
SYSTEM OF ELECTRICAL DISTRIBUTION
Filed Feb. 8, 1921
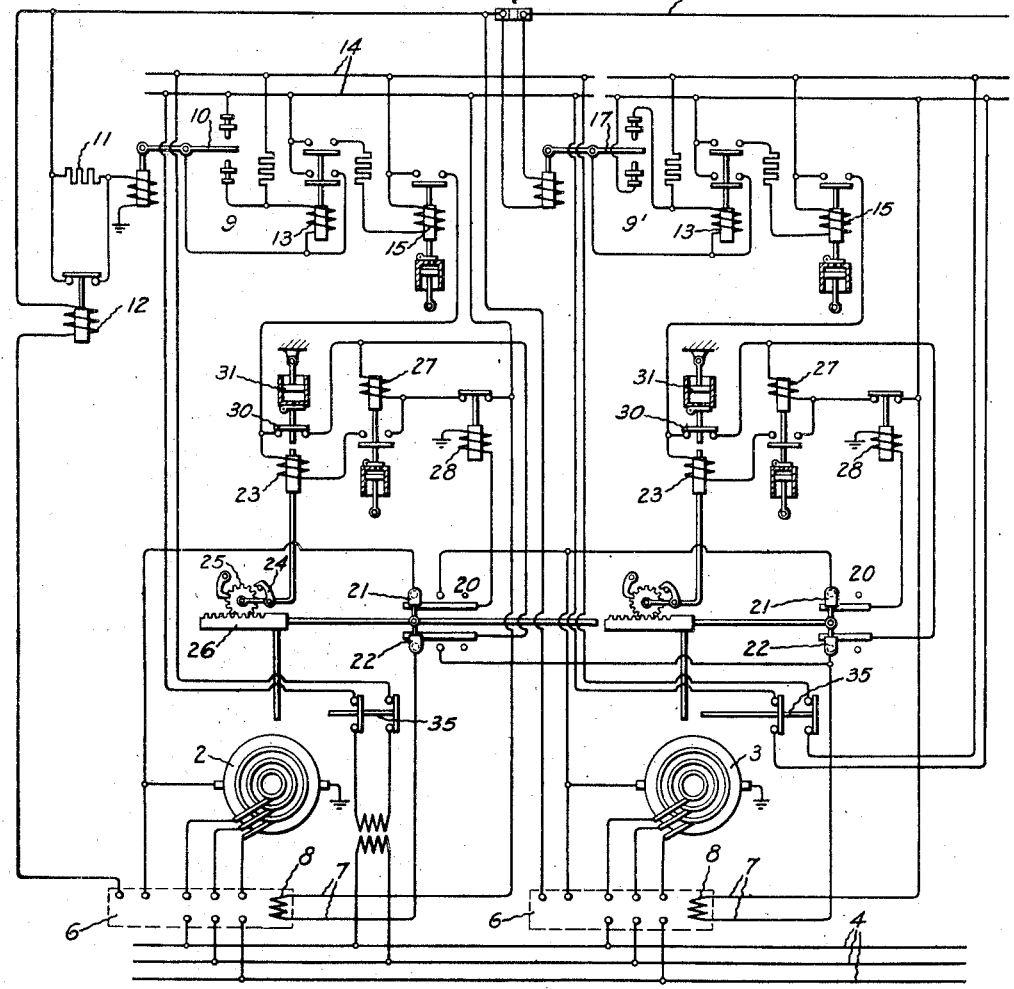
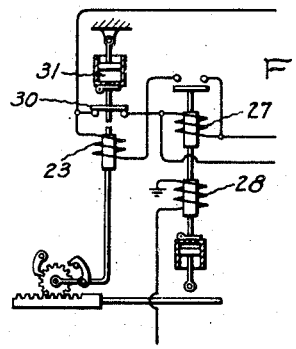
Inventor:
Earl M. Bill,
by Albert G. Davis
His Attorney.

Patented June 28, 1927.

1,633,804

UNITED STATES PATENT OFFICE.

EARL M. BILL, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

Application filed February 8, 1921. Serial No. 443,435.

My invention relates to systems of electrical distribution in which a plurality of sources of electric energy are adapted to be connected automatically to a common network in response to predetermined conditions indicating the demand for said sources.

In automatic substations and generating stations where each one of a plurality of sources of current such as rotary converters, generators, etc. is arranged to be started and connected automatically to a common net work in response to predetermined conditions indicating the demand for said source, it is very desirable that another source, which is not in use, should be started and connected to the common network in case any source fails to operate properly, or is not in an operative condition when the predetermined condition occurs which indicates the demand for operating said source.

One object of my invention is to provide in such a system in which a plurality of sources of current are adapted to be connected to a common network, and a control device is normally arranged to control the connection of one of said sources to the network, an arrangement whereby said control device is adapted to control the connection of a different one of said sources to said network if the source, whose connection to said network is normally controlled by said control device, is not in a condition to be connected to the network.

A further object of my invention is to provide in such a system in which a plurality of control devices are arranged to be operated in a predetermined sequence and each device is normally arranged to control the connection of a particular source to said network, an arrangement whereby each control device is adapted to control the connection of the source normally controlled by the next controlling device in said sequence whenever the source normally controlled by said first control device is not in an operative condition to be connected to the network.

My invention will be better understood from the following description taken in connection with the accompanying drawing, and its scope will be pointed out in the appended claims.

In the accompanying drawing, Fig. 1 diagrammatically shows one embodiment of my invention in which each one of a plurality of rotary converters is adapted to be automatically started and connected to a common direct current distribution circuit to supply current thereto in response to a predetermined condition of the distribution circuit indicating the demand for operating said rotary converter. Fig. 2 diagrammatically shows a modification of a portion of the control system shown in Fig. 1.

Referring to Fig. 1, 1 represents a direct current distribution circuit, one side of which is connected to ground, said distribution circuit being adapted to be supplied with current from a plurality of sources of current which in this embodiment of my invention are shown as rotary converters 2 and 3 supplied with alternating current from an alternating current supply line 4. While I have shown only two sources of current it will be apparent that my invention is not limited to this number but that any desired number of sources may be employed.

Each rotary converter is adapted to be automatically connected to the supply circuit 4 and the distribution circuit 1 by any suitable connecting means upon the occurrence of a predetermined condition. Since such connecting means are well-known in the art and do not form the subject matter of my invention, I have indicated such connecting means by dotted rectangles 6 in order to simplify the drawing. For a complete description of one type of connecting means for accomplishing this result reference may be had to the Taylor Patent No. 1,281,875, assigned to the same assignee as this application. In this patent, a connecting means is disclosed for automatically starting and connecting a rotary converter to a distribution circuit upon the occurrence of a predermined condition which is arranged to complete a starting circuit associated with the connecting means, said connecting means being also under the control of the direct current voltage of the rotary converter so that the rotary converter is not connected to the direct current distribution circuit if its direct current voltage does not build up to a predetermined value.

In the arrangement shown in the drawing, each connecting means 6 is provided with a starting circuit 7 including a master relay 8 which, when energized, sets the connecting means associated therewith into operation to connect the corresponding rotary converter to the supply circuit 4 and the distribution circuit 1, and which, when deenergized, sets the connecting means associated therewith into operation to shut the rotary converter down.

For normally controlling each connecting means 6 I have provided a separate control means 9 and 9'. These control means are responsive to different predetermined conditions of the distribution circuit which occur in a predetermined sequence so that said control means are operated in a predetermined sequence. Therefore, the rotary converters are also normally arranged to be started and connected to the distribution circuit to supply current thereto in a predetermined sequence. It will be apparent, however, that my invention is not limited to any particular means for operating the control means nor to the sequence in which the control means are operated. As indicated in the drawing, the control means 9, which normally controls the connecting means 6 associated with the rotary converter 2, is arranged to be operated upon the occurrence of a predetermined drop in the distribution circuit voltage to set said rotary converter into operation and to shut down said rotary converter when the current supplied thereby decreases below a predetermined value and the control means 9', which normally controls the connecting means 6 associated with the rotary converter 3, is arranged to be operated when the load on the rotary converter 2 exceeds a predetermined value to set the rotary converter 3 into operation and to shut down said rotary converter 3 when the total load on both of said rotary converters 2 and 3 decreases below a predetermined value.

The control means 9 shown for normally controlling the rotary converter 2 comprises a contact-making voltmeter 10 connected across the distribution circuit 1. A resistance 11 is provided in the circuit of the coil of the contact-making voltmeter and is adapted to be short circuited by the current relay 12 connected in the circuit through which the rotary converter 2 supplies current to the distribution circuit 1. This relay 12 is arranged to keep the short circuit around the resistance 11 open as long as the current supplied by the rotary converter 2 exceeds a predetermined value. The contact-making voltmeter 10 is arranged to complete the circuit of a relay 13 across the control circuit 14 when the voltage of the distribution circuit 1 drops below a predetermined value. The control circuit 14 is supplied with current from any suitable source, such as from the supply circuit 4. When the relay 13 becomes energized it closes a locking circuit for itself which is independent of the contacts of the contact-making voltmeter 10 so as to prevent sparking at the voltmeter contacts when the original energizing circuit of the relay is opened. The energization of the relay 13 also closes a circuit for the coil of the relay 15 which is arranged in any well-known manner so that it does not close its contacts until a predetermined length of time after the circuit thereof is completed, but will open its contacts as soon as the circuit of the relay is opened. The closing of the contacts of relay 15 completes a starting circuit associated with the rotary converter 2.

The control means 9' which normally controls the connection of the rotary converter 3 is similar to the control means 9 which normally controls the connection of the rotary converter 2 except that the circuit of the relay 13 is controlled by a contact-making ammeter 17 instead of a contact-making voltmeter. This contact-making ammeter 17 is connected in the distribution circuit so that it is responsive to the current supplied to the distribution circuit by both of the rotary converters 2 and 3.

In order that another rotary converter may be started and connected to the distribution circuit 1 to supply current thereto when a control means is operated and the rotary converter controlled thereby fails for any reason to deliver a predetermined direct current voltage within a predetermined length of time after the starting circuit thereof is completed I provide each control means in the arrangement shown in the drawing with a switch 20 of any suitable type which is adapted to be moved to a number of different positions. Each switch 20 is diagrammatically shown in the drawing as comprising two arms 21 and 22 insulated from each other and adapted to be moved in a straight line step by step by a relay 23 operating a ratchet 24 and a pinion 25 which in turn meshes with a rack 26 connected to the arms 21 and 22. The circuit of the coil of each relay 23 is controlled by the corresponding relay 15 and also a slow acting relay 27, the circuit of which is also controlled by the relay 15. Each relay 27 is arranged in any well-known manner so that it does not close its contacts to complete the circuit of the coil of the corresponding relay 23 until a predetermined interval of time after the relay 15 has closed its contacts, but opens its contacts as soon as the circuit thereof is opened. The circuit of the coil of the relay 27 also includes the normally closed contacts of a relay 28, the coil of which is adapted to be connected, by means of the arm 21 of the corresponding switch 20, across the direct current terminals of the rotary converter whose connection is being controlled by the control means associated with the particular switch 20.

This relay 28 is arranged to keep its contacts closed as long as the voltage applied across its terminals is below a predetermined value.

Each switch 20 is so arranged that in each position thereof, the arm 22 places a different starting circuit under the control of the corresponding control means and the arm 21 connects the coil of the corresponding relay 28 across the direct current terminals of the rotary converter whose connection is being controlled by the corresponding control means 7. The switches 20 are also arranged so that each switch when in its first or normal position places a different starting circuit 7 under the control of the corresponding control means and when moved from its normal position it places each starting circuit 7, which is normally completed after said corresponding control means has been operated, under the control of said corresponding control means in the same sequence in which they are normally completed. For example, in the arrangement shown, the rotary converter 3 is placed under the control of the control device 9 which normally controls the rotary converter 2 when the switch 20 associated with this control means 9 is moved into its second position. If the system shown were provided with a third rotary converter which would normally be operated after the rotary converter 3 had been started, this third rotary converter would be placed under the control of the control means 9, which normally controls the rotary converter 2, when the switch 20 associated with this control means 9 moves into its third position. This third rotary converter would also be placed under the control of the control means 9' which normally controls the rotary converter 3 when the switch 20 associated with this particular control means 9' moves into its second position. Since, however, I have shown only two rotary converters, the switch 20, associated with the control means 9, is adapted to place only the starting circuits associated with the rotary converters 2 and 3 under the control of the contact making voltmeter 10 and the switch 20 associated with the control means 9' is adapted to place only the starting circuit of the rotary converter 3 under the control of the contact making ammeter 17.

The switches 20 are so arranged that whenever any switch is moved by its corresponding relay 23 all of the other switches, except those associated with control means which have already been operated, are moved the same distance. In the arrangement shown in the drawing, the movement of any particular switch 20 moves all of the other switches to the right of this particular switch the same distance as this particular switch is moved, but does not disturb the position of any switch to the left of this particular switch.

In order to save power, I provide an arrangement whereby the control circuit of each control means is interrupted whenever the switch 20 associated therewith is moved into a position in which no connecting means is placed under the control of the corresponding control means. In the arrangement shown, this position for each switch is the one it is moved into when moved out of the position in which the source, whose connection to the distribution circuit is normally controlled by the last control means in the sequence, is placed under the control of the corresponding control means. For accomplishing this result I provide each switch 20 with a limit switch 35 which is arranged to be opened whenever the corresponding switch 20 moves out of the position in which the starting circuit of the rotary converter 3 is placed under the control of the corresponding control means. Therefore, the switch 20 associated with the control means 9 opens its switch 35 when it is moved out of its second position and the switch 20 associated with the control means 9' opens its switch 35 when it is moved out of its first position. Each switch 35 interrupts the control circuit of its corresponding control means and the control means which follows that particular control means in said sequence. In the arrangement shown in the drawing, the operation of the switch 35 associated with the control means 9 interrupts the control circuits of both of the control means 9 and 9', whereas the opening of the switch 35 associated with the control means 9' interrupts the control circuit of the control means 9' only.

Each relay 23 is provided with an interlock 30 which is in the circuit of the coil of the relay 27 and this interlock is arranged in any suitable manner, as by means of a dash-pot 31, so that it may be opened quickly but does not close again until a predetermined interval after the relay 23 becomes de-energized.

The operation of the embodiment of my invention shown in Fig. 1 is as follows: Let it be assumed that the distribution circuit 1 is supplied with current from some source not shown and that the rotary converters 2 and 3 are shut down. As long as the voltage on the distribution circuit 1 remains above a predetermined value, the rotary converters 2 and 3 remain shut down. When, however, the voltage drops so that the contact-making voltmeter 10 engages its upper contact the circuits of the relays 13 and 15 associated therewith are completed across the control circuit 14 and, after a certain interval of time determined by the construction of the relay 15, the starting circuit 7 of the connecting means associated with the rotary converter 2 is completed. This starting circuit may be traced from the upper lead of the control circuit 14 through the contacts of the relay 15, interlock 30, arm 22 of the switch 20 in its first position, control circuit 7 and the master relay 8 to the lower lead of the control circuit 14. At the same time a circuit is completed for the relay 27 which may be traced from the upper lead of the control circuit 14 through the contacts of the relay 15, interlock 30, coil of the relay 27 and contacts of the relay 28 to the lower lead of the control circuit 14. As above described, the relay 27 is so arranged that it does not close its contacts until a predetermined interval of time after the circuit therefor is completed.

The completion of the starting circuit 7 associated with the rotary converter 2 sets the connecting means 6 into operation to establish the necessary connections to the supply circuit 4 to start the rotary converter and to connect it at the proper time to the distribution circuit 1, if it is in condition to supply current thereto. As soon as the direct current voltage of the rotary converter reaches a predetermined value it operates the relay 28 to open the circuit of the relay 27 thereby preventing relay 27 from closing the circuit of the relay 23. Therefore it will be evident that if the rotary converter is in an operative condition so that the relay 23 is not energized, the switch 20 associated therewith will not be moved out of its normal position. As soon as the rotary converter 2 is connected to the distribution circuit 1 and begins to supply current thereto the current relay 12 operates to open the short circuit around the resistance 11 so that the contact-making voltmeter 10 will continue to indicate a low voltage even though the voltage of the distribution circuit is restored to its normal value. The rotary converter 2 remains connected to the distribution circuit as long as the current supplied thereby exceeds a predetermined value. When this current drops below a predetermined value, the relay 12 closes its contacts and short circuits the resistance 11, whereupon the contact-making voltmeter 10 engages its lower contact unless the voltage of the distribution circuit is below a predetermined value. When the contact-making voltmeter engages its lower contact, it short circuits the coil of the relay 13 which, thereupon, becomes deenergized and in turn deenergizes the relay 15. The relay 15 then opens the starting circuit 7 whereupon the master relay 8 becomes deenergized and the connecting means 6 associated with the rotary converter 2 is operated in a manner well known in the art to disconnect the rotary converter from the supply and distribution circuits.

If the load on the rotary converter 2 exceeds a predetermined value while it is connected to the distribution circuit 1, the contact-making ammeter 17 operates to complete the starting circuit 7 associated with the rotary converter 3. The rotary converter 3 is then started and connected to the distribution circuit in the same manner in which the rotary converter 2 was started and connected to the distribution circuit. The rotary converter 3 remains connected to the distribution circuit as long as the total current supplied by the rotary converters 2 and 3 exceeds a predetermined value. When this current drops below this predetermined value the contact-making ammeter 17 operates to effect the opening of the starting circuit 7 associated with the rotary converter 3, whereupon the connecting means 6 associated with the rotary converter 3 is operated to disconnect the rotary converter 3 from the supply and distribution circuits.

Let us now assume that the rotary converter 2 is not in an operative condition at the time the starting circuit 7 thereof is completed in response to the operation of the contact-making voltmeter 10. The relay 27 then has time to close its contacts and complete the circuit of the relay 23, whereupon the switch 20 associated therewith and all of the other switches 20 to the right thereof are moved into their second positions.

This movement of the switch 20 associated with the contact-making voltmeter 10 interrupts the starting circuit of the rotary converter 2 so that the master relay 8 becomes deenergized and the connecting means 6 is operated to shut the rotary converter down if it has been started. In the second position of this switch 20 the arm 21 connects the coil of the corresponding relay 28 across the direct current terminals of the rotary converter 3 and the arm 22 places the starting circuit 7 of the rotary converter 3 under the control of the contact-making voltmeter 10. In order to prevent the rotary converter 3 from being started before the relay 27 is restored to its normal position, the relay 23 is arranged when energized to operate the interlock 30 to open the circuit of the coil of the relay 27 and the connection between the arm 22 and the control circuit 14. The opening of the circuit of the relay 27 allows the relay to open its contacts. As soon as contacts of the relay 27 are opened, the circuit of the coil of relay 23 is opened and after a predetermined length of time determined by the setting of the dash-pot 31, the interlock 30 closes and completes the circuit of the coil 27 and the starting circuit 7 of the rotary converter 3, whereupon the same cycle of operation is repeated for starting and connecting the rotary converter 3, as in the case of the rotary converter 2. In case the rotary converter 3 is not in an operative condition at this time, the switch 20 associated with the control means 9 is again operated by the relay 23 after the relay 27 has had time to close its contacts.

This movement of the switch 20 associated with control means 9 into its second position also causes the switch 20 associated with the control means 9' to move out of its normal position, thereby removing the starting circuit 7 of the rotary converter 3 from the control of the contact-making ammeter 17. Since there is no other rotary converter available which can be placed under the control of the contact-making ammeter 17 when the switch 20 associated therewith is moved out of its normal position, it will be evident that there is no need of energizing the relays 13, 15, 23 and 27 of the control means 9' when the position of the contact-making ammeter 17 indicates the demand for operating another rotary converter. Therefore I have provided the switch 20, associated with the control means 9', with the switch 35, which is operated when this particular switch 20 moves out of its normal position, to interrupt the control circuit leading to these relays. For a similar reason I provide the switch 20 associated with the control means 9 with a similar switch 35 which is operated when this particular switch 20 is moved out of its second position in case the rotary converter 3 is not in an operative condition. This particular switch 35 when operated by the corresponding switch 20 interrupts the control circuit leading to the relays of the control means 9 and 9'.

Each switch 20 is so arranged that it remains in the position to which it is moved so that if any rotary converter fails to operate, it remains permanently out of service until the switches 20 are manually restored to their normal positions.

The arrangement shown in Fig. 2 is a modification of the arrangement shown in Fig. 1 for controlling the energization of the coil of the relay 23. In this modification the coils of the relays 27 and 28 are mechanically connected together and the relays are arranged to oppose each other, the pull exerted by the relay 28 being arranged to overpower the pull of the relay 27 when the voltage impressed across the terminals of the relay 28 is a predetermined value so that the circuit of the relay 23 is not closed. It is believed that the operation of this modification will be obvious from the description and therefore a detailed description thereof is deemed unnecessary.

While I have shown and described one embodiment of my invention, I do not desire to be limited thereto, but seek to cover in the appended claims all those modifications which come within the true spirit and scope of my invention.

What I claim as new and desire to secure by Letters Patent of the United States, is,—

1. In a system of distribution, a distribution circuit, a plurality of dynamo electric machines adapted to be started and subsequently to be connected automatically to said distribution circuit to supply current thereto, a plurality of control devices adapted to be operated in a predetermined sequence, each one of said control devices normally being adapted to control the starting of a different one of said machines, and means associated with each control device and operative in response to a predetermined condition of the machine normally controlled thereby for placing a different machine under the control of such control device and all of the other control devices following such control device in said predetermined sequence.

2. In a system of electrical distribution, a distribution circuit, a plurality of sources of current, means associated with each source for connecting it to said distribution circuit, a plurality of control devices adapted to be operated in a predetermined sequence, each one of said devices being adapted normally to control the operation of a separate one of said connecting means, and means associated with each control device and controlled by a condition of the source whose connection is normally controlled thereby for placing a different one of said connecting means under the control of said device and each one of the control devices following said device in said sequence.

3. In a system of distribution, a distribution circuit, a plurality of dynamo electric machines adapted to be started and subsequently to be connected automatically to said distribution circuit, a plurality of control devices adapted to be operated in a predetermined sequence, each one of said control devices normally being adapted to control the starting of a different one of said machines and means associated with each control device and operative in response to a predetermined condition of the machine normally controlled thereby for placing each machine which is normally controlled by a control device following such device in said sequence under the control of the control device which immediately precedes in said predetermined sequence the control device normally controlling the respective machines.

4. In a system of electrical distribution, a distribution circuit, a plurality of sources of current, means associated with each source for connecting it to said distribution circuit, a plurality of control devices adapted to be operated in a predetermined sequence, each one of said devices being adapted normally to control the operation of a different one of said connecting means, and means associated with each control device and controlled by a condition of the source whose connection is normally controlled thereby for placing each connecting means which is normally controlled by a control device following such device in said sequence under the control of the control device which immediately precedes in said sequence the control device which normally controls the respective connecting means.

5. In a system of electrical distribution, a distribution circuit, a plurality of sources of current, means associated with each source for connecting it to said circuit, a plurality of control devices arranged to be operated in a predetermined sequence, electromagnetic means associated with each device and controlled thereby, each of said electromagnetic means being arranged normally to control the operation of a separate one of said connecting means, switching means associated with each electromagnetic means and adapted to be operated in response to a predetermined condition of the source whose connection is being controlled by the corresponding electromagnetic means to place each connecting means which is normally operated after said corresponding electromagnetic means under the control of said corresponding electromagnetic means, and means associated with each electromagnetic means and adapted to be operated to render said electromagnetic means inoperative when the corresponding switching means is moved into a position in which no connecting means is placed under the control of said corresponding electromagnetic means.

6. In a system of electrical distribution, a distribution circuit, a plurality of sources of current, means associated with each source for connecting it to said circuit, a plurality of control devices arranged to be operated in a predetermined sequence, electromagnetic means associated with each device and controlled thereby, each of said electromagnetic means being arranged normally to control the operation of a separate one of said connecting means, switching means associated with each electromagnetic means and adapted to be operated in response to a predetermined condition of the source whose connection is being controlled by the corresponding electromagnetic means to place each connecting means which is normally operated after said corresponding electromagnetic means under the control of said corresponding electromagnetic means in the same sequence in which said connecting means are arranged to be operated normally, and means associated with each electromagnetic means and adapted to be operated to render said electromagnetic means inoperative when the corresponding switching means is moved out of the position in which the connecting means which is normally controlled by the last control device in said sequence is placed under the control of said switching means.

7. In a system of distribution, a distribution circuit, a plurality of sources of current, means associated with each source for connecting it to said circuit, means responsive to the voltage of said circuit and normally arranged to control the operation of one of said connecting means, means connected to said circuit so as to be responsive to the current supplied thereto by the source which is connected thereto in response to the operation of said voltage responsive means and normally arranged to control the operation of another one of said connecting means, and means controlled by a predetermined condition of the source whose connecting means is normally controlled by said voltage responsive means for placing the connecting means normally controlled by said current responsive means under the control of said voltage responsive means and for placing another connecting means under the control of said current responsive means.

8. In a system of distribution, a distribution circuit, a plurality of sources of current, automatic switching means associated with each source for connecting it to said circuit, means responsive to the voltage of said circuit normally arranged to control the operation of one of said switching means, means responsive to the total current supplied by said sources normally arranged to control the operation of another of said switching means, and means operative upon the failure of said one of said switching means to operate in a predetermined manner within a predetermined time to place under the control of said voltage responsive means the switching means which is normally controlled by said current responsive means.

9. In a system of distribution, a distribution circuit, a plurality of sources of current, automatic switching means associated with each source for connecting it to said circuit, means responsive to the voltage of said circuit normally arranged to control the operation of one of said switching means, means responsive to the total current supplied by said sources normally arranged to control the operation of another of said switching means, and means operative upon the failure of said one of said switching means to operate in a predetermined manner within a predetermined time to place under the control of said voltage responsive means the switching means which is normally controlled by said current responsive means and for placing another connecting means under the control of said current responsive means.

10. In a system of distribution, a distribution circuit, a plurality of sources of current, automatic switching means associated with each source for connecting it to said circuit, means responsive to the voltage of said circuit normally arranged to control the operation of one of said switching means, a relay responsive to the total current supplied to said circuit by said sources normally arranged to control the operation of another of said switching means, and means operative upon the failure of said one of said switching means to operate in a predetermined manner within a predetermined time to place under the control of said voltage responsive means the switching means which is normally controlled by said current responsive relay.

11. In a system of distribution, a distribution circuit, a plurality of sources of current, automatic switching means associated with each source for effecting the connection thereof to said circuit, a plurality of control devices adapted to be operated in a predetermined sequence, each of said devices being adapted normally to control the operation of a different switching means, and means associated with each control device and operative upon the failure of the switching means normally controlled thereby to operate in a predetermined manner within a predetermined time to place a different switching means under the control of the respective control device and each of the control devices following said device in said sequence.

12. In a system of distribution, a distribution circuit, a plurality of sources of current, automatic switching means associated with each source for controlling the connection thereof to said circuit, a control device, timing means controlled by said control device and normally arranged to effect the operation of one of said automatic switching means after said control device has remained in a predetermined position for a predetermined time, and means operative upon the failure of said one of said automatic switching means to operate in a predetermined manner within a predetermined time to place another of said switching means under the control of said timing means.

13. In a system of distribution, a distribution circuit, a plurality of sources of current, automatic switching means associated with each source for controlling the connection thereof to said circuit, a control device responsive to a predetermined electrical condition of said circuit, a time relay controlled by said control device and normally arranged to effect the operation of one of said switching means after said control device has remained in a predetermined position for a predetermined time, and means operative upon the failure of said one of said automatic switching means to operate in a predetermined manner within a predetermined time to place another of said switching means under the control of said timing means.

In witness whereof, I have hereunto set my hand this 5th day of February, 1921.

EARL M. BILL.